US008460543B2

(12) United States Patent
Page, Jr.

(10) Patent No.: US 8,460,543 B2
(45) Date of Patent: Jun. 11, 2013

(54) PORTABLE WATER PURIFIERS AND METHODS OF PURIFYING

(75) Inventor: George Page, Jr., Chicago, IL (US)

(73) Assignee: George A. Page, Jr., Chicago, IL (US)

( * ) Notice: Subject to any disclaimer, the term of this patent is extended or adjusted under 35 U.S.C. 154(b) by 545 days.

(21) Appl. No.: 12/718,933

(22) Filed: Mar. 5, 2010

(65) Prior Publication Data

US 2010/0320128 A1 Dec. 23, 2010

Related U.S. Application Data

(60) Provisional application No. 61/269,026, filed on Jun. 19, 2009, provisional application No. 61/272,801, filed on Nov. 4, 2009, provisional application No. 61/336,208, filed on Jan. 19, 2010.

(51) Int. Cl.
*B01D 35/00* (2006.01)
*C02F 1/52* (2006.01)

(52) U.S. Cl.
USPC ............ 210/203; 210/205; 210/219; 210/241

(58) Field of Classification Search
USPC .................. 210/203, 205, 206, 207, 208, 219, 210/241
See application file for complete search history.

(56) References Cited

U.S. PATENT DOCUMENTS 2,518,026 A * 8/1950 Krapp ............................ 285/312
3,483,979 A * 12/1969 Messa et al. ..................... 210/94

* cited by examiner

*Primary Examiner* — Lucas Stelling
(74) *Attorney, Agent, or Firm* — George A. Page, Jr.

(57) ABSTRACT

A portable water purifier for purifying a liquid to a safe form acceptable for drinking may be provided. The portable water purifier may include a container configured to hold the liquid, a filtering mechanism connected to the container configured to filter out dirt or sediment floc from the liquid, and a transport mechanism in communication with the filtering mechanism configured to transport the liquid into the filtering mechanism. The portable water purifier may also include a mixer inside the container configured to disperse a chemical disinfectant or a flocculating agent tablet within a liquid, for instance water.

15 Claims, 8 Drawing Sheets

PORTABLE WATER PURIFIERS AND METHODS OF PURIFYING

CROSS-REFERENCE TO RELATED APPLICATIONS

This application claims the benefit of U.S. Provisional Patent Application Ser. No. 61/269,026, filed on Jun. 19, 2009, entitled "Water Treatment Sunglasses", U.S. Provisional Patent Application Ser. No. 61/272,801, filed on Nov. 24, 2009, entitled "Water Treatment Travel Kit", and U.S. Provisional Patent Application Ser. No. 61/336,208, filed on Jan. 19, 2010, entitled "Purification Filter", each of which is expressly incorporated herein by reference in its entirety.

COPYRIGHTS

All rights, including copyrights, in the material included herein are vested in and the property of the Applicant. The Applicant retains and reserve all rights in the material included herein, and grants permission to reproduce the material only in connection with reproduction of the granted patent and for no other purpose.

BACKGROUND

According to the World Health Organization presently nearly 3.4 million people die each year as a result of water related diseases, the leading cause in number of deaths worldwide. This number of deaths is greater than the death toll from wars, terrorism, or weapons of mass destruction combined. Waterborne deaths affect developing nations in the greatest measure, with nearly 4000 child deaths occurring each day from water related illnesses. The lack of access to fresh water combined with a lack of proper treatment facilities creates a fertile environment for waterborne diseases throughout the world. Because many portable water treatment products available to backpackers, campers, and travelers either chemically treat or filter untreated water, these products are limited in their ability to effectively address the problem.

Effective primary water treatment is not available to a large percentage of the undeveloped world. In cases when natural disasters occur, primary water treatment may not be available. When disasters occur, a fully functional but transportable treatment device is essential for sustaining life. Current water purification methods are either large and bulky, or inadequate as not to provide primary water treatment. Some methods for water treatment include: water purification tablets, ultraviolet lamps, or various large volume treatment devices requiring excessive power sources.

Water treatment tablets are popular to use, but, do not provide adequate accompaniments to be utilized properly. When using water purification tablets, directions provided from manufacturers instruct a user to obtain a collection vessel, an agitation device such as a utensil, stir for 10 minutes, obtain both a cloth and additional vessel to pour the liquid thru, to separate sediment floc, and drink the remains. When traveling, or, in the case of a disaster, an individual will not have access to the excessive number of accompaniments required by the manufacturer of water purification tablets. Thus, water purification tablets are ineffective and useless in travel or emergency situations.

Numerous chemical treatment methods contain iodine pills or chlorine tablets which leave a sour taste. Chemical treatment (iodine pills or chlorine tablets) protects against viruses but does not filter out turbidity particulates in a water source. Using filters will filter out turbidity, but will not protect against dangerous bacteria. Conventional water treatment systems that effectively treat water against viruses and bacteria by properly mixing or agitating the chemicals and filtering out turbidity are bulky and costly systems which are difficult to transport. For example, some conventional systems refer to a portable water treatment device as being a system that is able to fit on the back of a compact truck. Obviously, such a bulky water treatment device would not be useful to a backpacker or traveler in need of water treatment. Still another conventional water purification device requires bulky, multiple bag filters and though transportable, can't be packed within luggage for lightweight portability.

Other conventional water treatment systems are ineffective at removing harmful bacteria and turbidity. For example, some conventional systems treat water with costly ultraviolet lamps, which although considered portable, do not effectively kill all viruses or bacteria in high turbidity water sources. Further, an ultraviolet lamp does not work as effectively as chemical treatment. The more dirt and turbidity in a water source, the more difficult it is for an ultraviolet lamp to be effective. Thus, an ultraviolet lamp is only effective in relatively pure water conditions where a relatively low level of water treatment is needed, or, polishing of re-treated water is required. Since this is not a normal condition in most cases, ultraviolet lamps are relatively ineffective.

Common water treatment devices are bulky and not very mobile. Many households invest in filters, but most are unaware of best use practices when treating untreated drinking water. Campers and travelers have access to basic treatment for viruses, but are unable to remove dirt and turbidity with current systems on the market.

The conventional water purification systems do not provide a lightweight water treatment device that provides treatment, agitation, and filtration in a unitary convenient system that is truly compact and useful in various situations.

SUMMARY

This Summary is provided to introduce a selection of concepts in a simplified form that are further described below in the Detailed Description. This Summary is not intended to be used to limit the claimed subject matter's scope.

Drinking Water Portable Purifiers may be provided. The Drinking Water Portable Purifiers may comprise a system that includes a deformable or collapsible container with a molded mixer, water purification tablets or alternative purification elements, transport and filtering mechanisms, and suction method for consumption. The systems allow users the ability to expand the collapsible container offering compact methods of collection, mixing, and purification through filtration of any liquid with a similar viscosity of water. Water Purification tablets may purify untreated water by chemically killing bacteria and flocculating dirt particulates. The mixer, and the transport and filtering mechanisms may agitate and filter the remaining floc to allow clean drinking water for consumption. The portable water purifiers may expand for collection, purification, and filtration and collapse to a pancake configuration for travel/storage.

The purifiers are lightweight and portable devices which can be stored in small baggage for transport anywhere around the world. They may operate with or without battery power to provide adequate treatment in any disaster situation. Filter housings may be replaced by any user as needed to ensure maximum filter operability. The purifiers address problems with lack of primary liquid treatment in areas where access to primary water treatment is unavailable. They may also facilitate ease of use by efficiently combining three operations following liquid collection: purification tablet addition, mixing agitation, and transport thru filtration to purify the liquid, such as water.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

The following is a tabulation of some prior art that presently appears relevant

U.S. Patents

| Pat. No. | Issue Date | Patentee |
| --- | --- | --- |
| 3,095,365 | June 1963 | Green |
| 3,865,710 | February 1975 | Phipps |
| 4,894,154 | January 1990 | Roz, et al |
| 6,228,255 | May 2001 | Peterson, et al |
| 6,299,770 | October 2001 | Diener, et al |
| 6,936,176 | August 2005 | Green III, et al |
| 7,306,716 | December 2007 | Baarman |
| 7,575,678 | August 2009 | Chi-Chang Kuo |

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

Consistent with embodiments of the invention, a portable water purifier may be provided that is a transportable, unitary, easy to use, and a complete purification system. Able to chemically treat, mix, and filter untreated, unknown water sources easily, the portable water purifier may originate in or deform or collapse to a size compact enough to transport easily.

Figure 1:
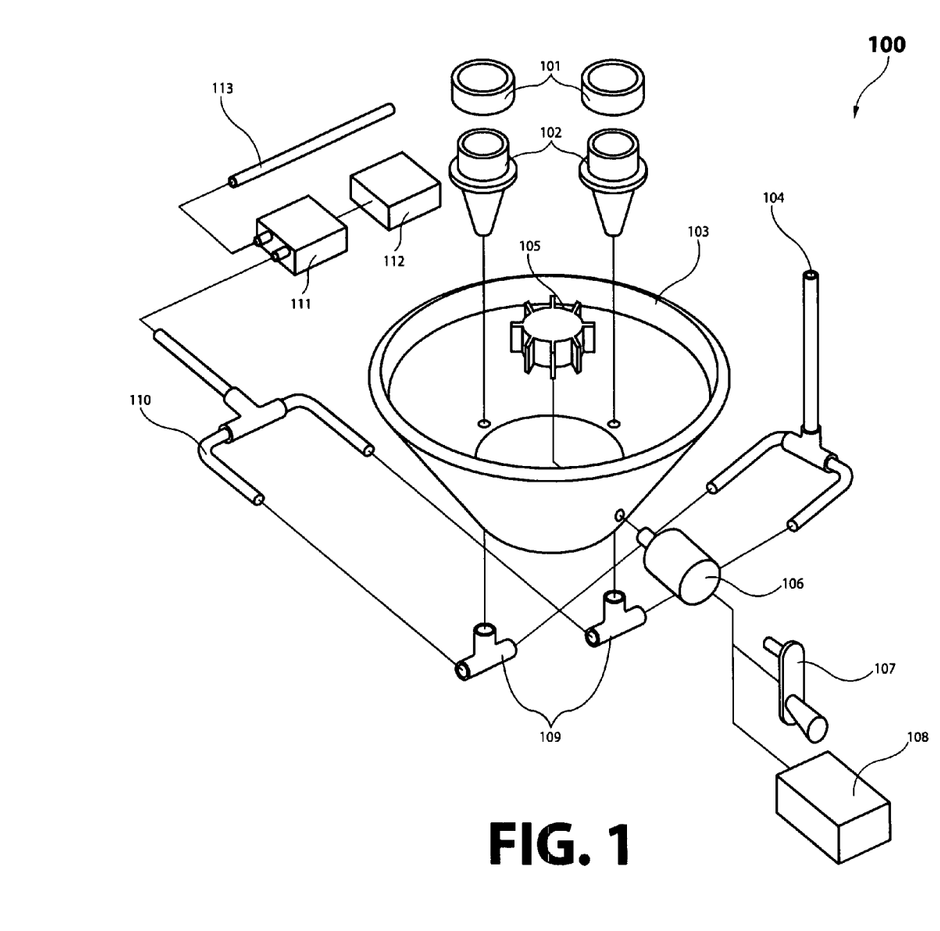
FIG. 1 shows an exploded perspective view of a portable water purifier.

FIG. 1 shows an exploded perspective view of a portable water purifier 100. The purifier 100 may provide a filtering mechanism including filter assemblies 101, for instance pancake filters, and filter housings 102, for instance conical cylinder-shaped housings configured to filter out dirt or sediment floc from the liquid, for instance water. The purifier 100 may also include a reservoir container 103, a mixer such as a mixing blade 105 connected to a mixing motor 106 associated with a drive mechanism, such as a battery source 108. In the alternative the mixing blade 105 may be driven by a hand crank mechanism 107.

The purifier 100 may also include a transport mechanism in communication with the filtering mechanism. The transport mechanism may be configured to transport the liquid into and through the filtering mechanism and may include T-connector assemblies 109, associated tubing 110, a liquid pump 111, and a liquid pump power source, such as battery source 112. The transport mechanism may also include drinking or recycling tubes 113 and 104. As an alternative to utilizing the liquid pump 111 and battery source 112, the drinking tube 104 may serve as means to transport liquid into and out of the filtering mechanism via suction on the drinking tube 104 for consumption through the filtering and transport mechanisms into the drinking tube 104.

Consistent with embodiments of the invention the mixing blade 105 may sit at a base of the container 103 and may be used to flocculate any tablet, powder, purifying mix, or drink mix. The mixing blade 105 may operate automatically when battery power source 108 is available. When battery power is unavailable, a mechanical coil or motor operates the mixing blade 105 by winding a coil with the crank mechanism or lever 107.

Water purification tablets may be provided with the purifier 100 and used to disinfect and coagulate floc particulates. Two filter housings 102 may fit in the bottom of the purifier 100. The filter assemblies 101 connected to the filter housings 102 may contain an activated charcoal absorption layer, surrounded within a cloth filter pancake configuration described in further detail with respect to FIG. 4. This allows the purifier 100 to adequately filter large debris and fine floc thus, purifying a liquid source. The filter assemblies 101 may be unscrewed to clean or backwash the filters or the filters may be replaced as necessary. Each filter housing 102 may be connected to tubing 110 which leads into a T connector assembly 109 to allow multiple inlet sources. For extremely turbid water sources, the T section tubing may be re-directed back into the purifier container 103 for re-purification or re-filtering of water on a $2^{nd}$ and $3^{rd}$ pass.

The chemical storage tablets may be a mix of chemical disinfectant and chemical flocculant. Chemical disinfectants, such as chlorine dioxide, will kill most common bacteria including; protozoa, bacteria and viruses. A chemical flocculant, such as an Aluminum Sulfate/Sodium Aluminate mix, is helpful for coagulation of dirt particles in untreated water.

Figure 2:
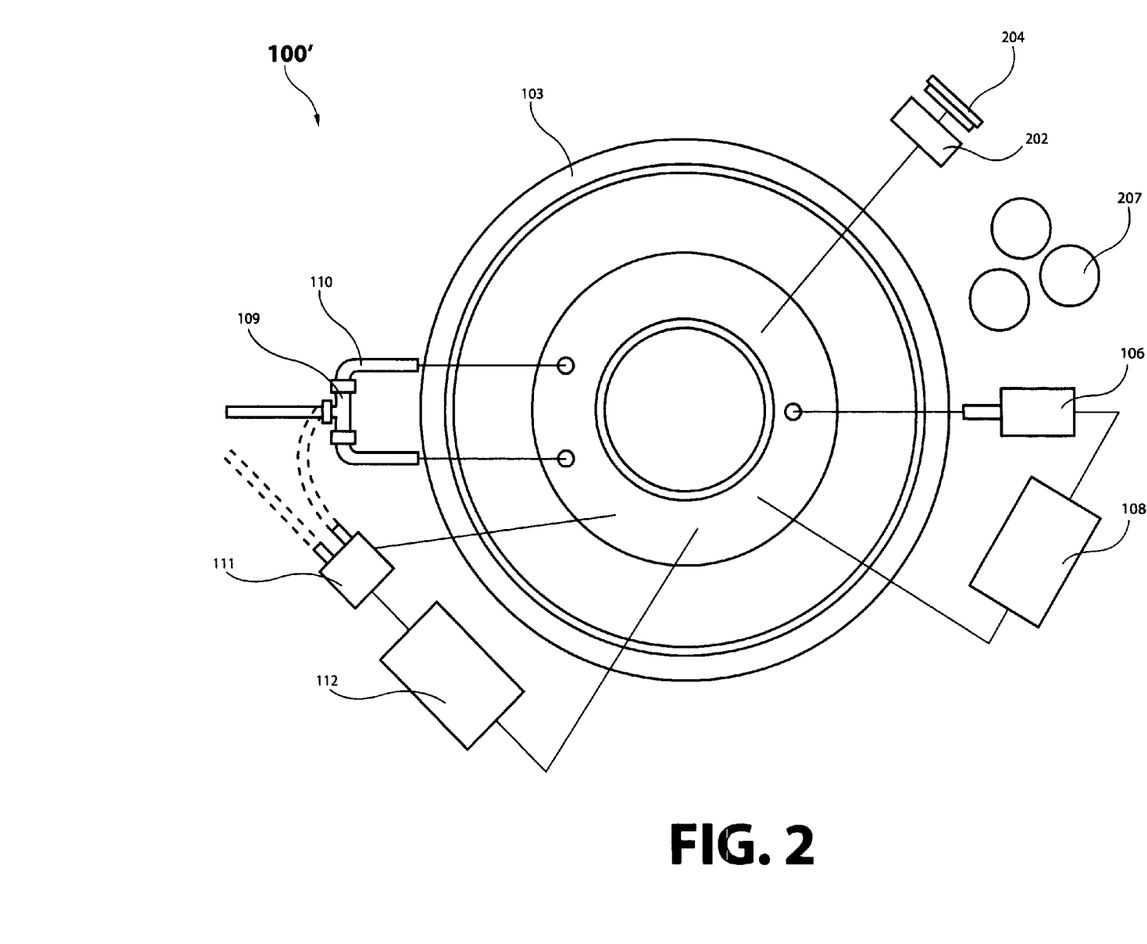
FIG. 2 shows an exploded bottom view of a portable liquid purifier.

FIG. 2 shows an exploded bottom view of the portable liquid purifier 100'. The purifier 100' may further include a treatment tablet storage base 202 connected to the purifier as a holding cell for purification powders or chemicals, such as purification treatment tablets 207. The storage base 202 may also complimentarily receive an air tight storage screw top 204 for retaining and preserving the tablets 207.

Alternatives to the water purification tablets may include a mixture of baking soda and bleach or baking soda and vinegar to effectively accomplish the same thing as a water purification tablets. The bleach disinfects and kills bacteria (2-5 drops per liter of water), as will vinegar (1-2 teaspoons per liter of water) and the baking soda will settle out dirt floc (1-3 tablespoons per liter of water), although aluminum sulfate may be more effective. Some people in remote areas of the international community have access to baking soda and vinegar or bleach. The bleach or vinegar may be added first, then the mixer 105 may be activated, then the baking soda may be added and the mixing continued. The mixing may occur twice as long as when using the tablets 207, but the bacteria will still be killed and dirt settled out in a similar way as using tablets.

Water purification tablets may include aluminum sulfate and chlorine dioxide. The main ingredient in baking soda, sodium bicarbonate, is an effective flocculant alternative to aluminum sulfate and bleach or vinegar are alternatives to chlorine dioxide. Thus, these household ingredients may take the place of the tablets. Two to five drops from a dropper of bleach or one to three teaspoons of vinegar and two to three tablespoons of baking soda will treat one large container contents of 1 liter, and approx ¼th of that (1 drop of bleach/½ spoon of baking soda) for the smaller device of 10 ounces.

Figure 3:
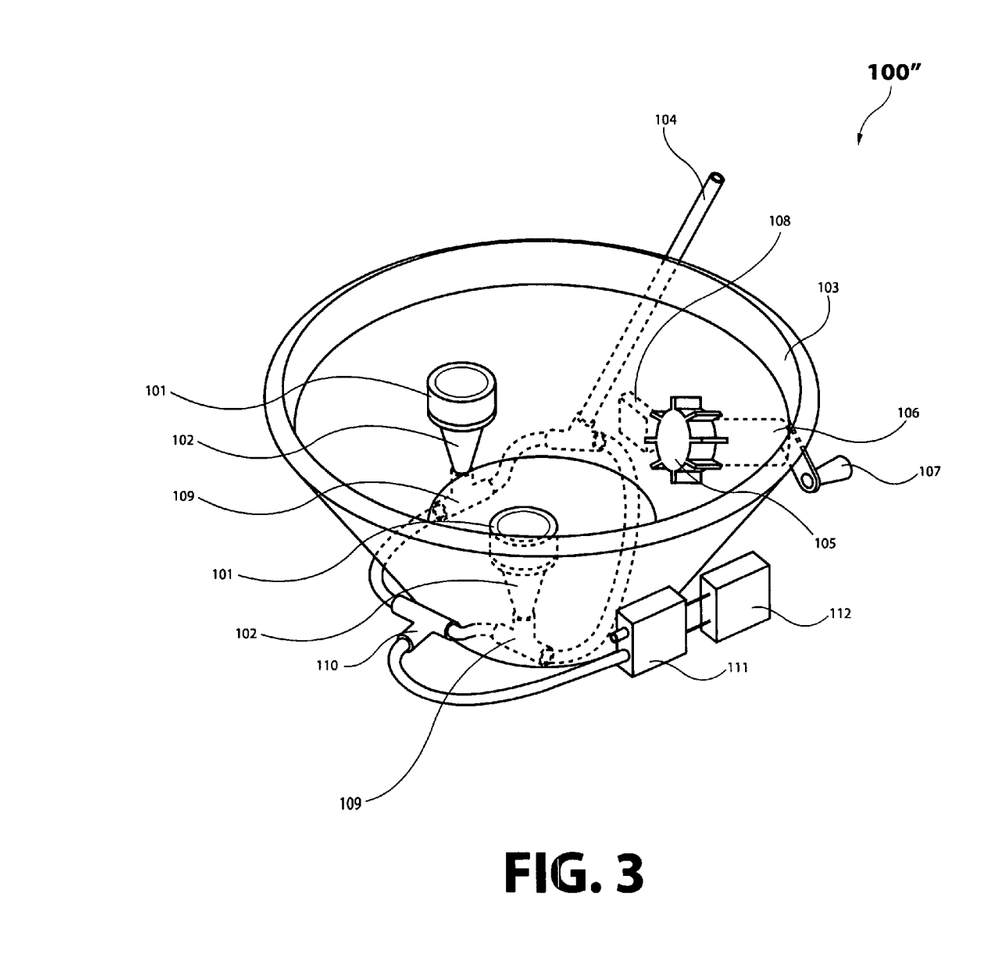
FIG. 3 shows a perspective view of an assembled portable water purifier.

FIG. 3 shows a perspective view of an assembled portable water purifier 100" illustrating some of the component parts described with respect to FIG. 1. Agitation of the coagulants and disinfectant tablets may be achieved via rotation of the mixing blade 105 to allow for proper chemical and flocculent dispersion. The mixing motor propels the mixing operation by crank shaft 107 or battery operated motor 106. A drive mechanism may be in communication with the mixing blade 105 as a crank shaft 107 with winding coil for mechanical operation or a DC power source 108 for automatic agitation.

An alternative to the open faced container 103 may be a cover or top-equipped container that may server as both a shaker and a filter mechanism. For example, a tube made from a hard plastic (approx 2.5 inch diameter) that has a top. Opening the top can let water enter the tube device along with a purification tablet, closing the top to shake the contents may provide mixing properties without use of a mixing blade. The tube device may also have a bottom spout to remove liquid contents directly through a filter via suction. The filter may be located on the inside wall of the tube and could be cone molded on the inside of the tube device.

Figure 4:
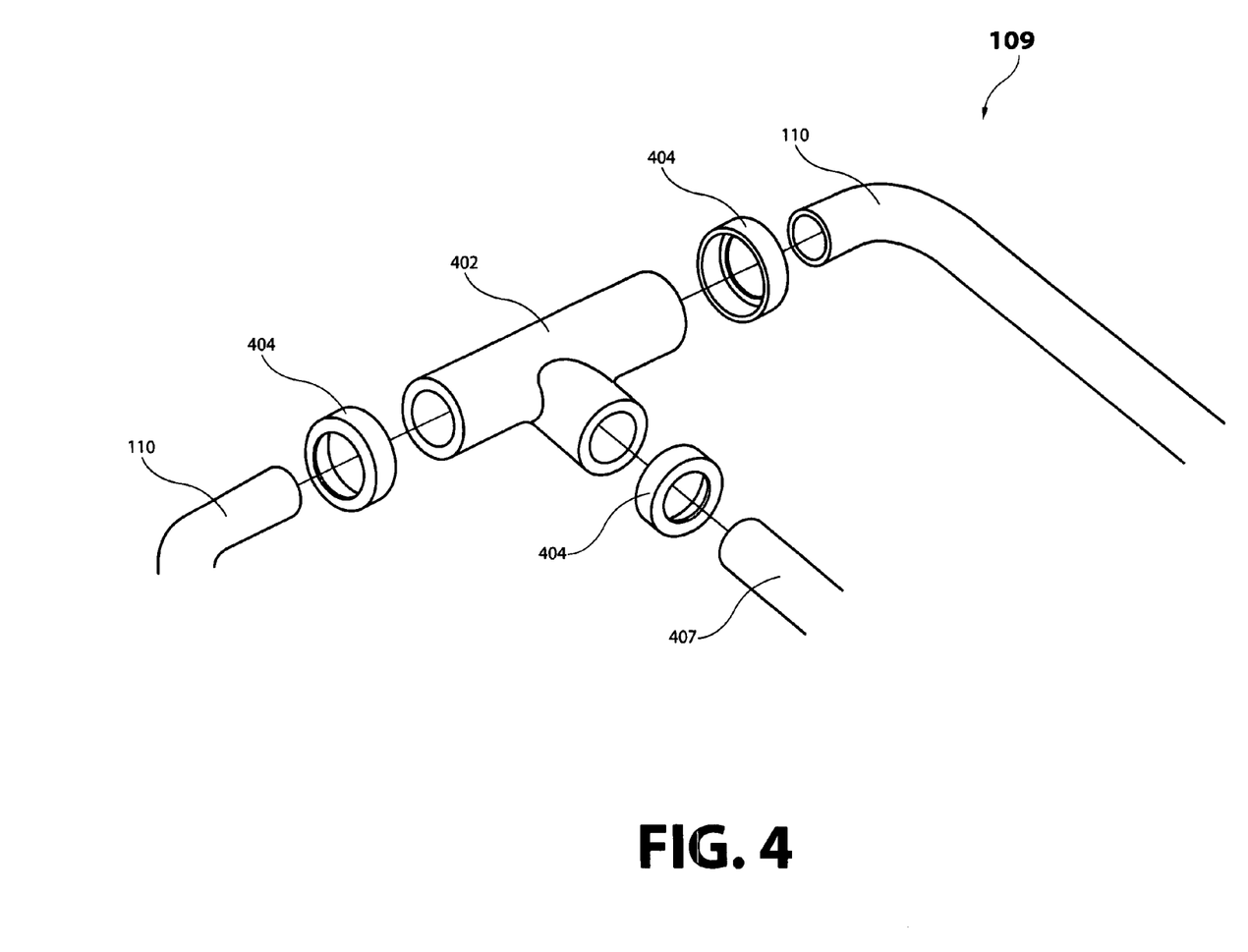
FIG. 4 shows a suction flow T-Connector transport assembly for use in a portable water purifier.

FIG. 4 shows a suction flow T-Connector transport assembly 109 and associated tubing 110 for use in a transport mechanism of a portable water purifier. The T-connector assembly 109 is a suction flow distributor that provides an even suction flow of water thru filter devices or mechanisms to provide even filter surface distributive treatment by a T-connector housing 402. Female to female quick connections 404 allow for even suction pressure, applied via filter water collection tubing 110, depositing filtered water which may exit thru clear water feed tubing 407. The clear water tubing 407 contains purified water for consumption directly thru the drinking tube 104, or is fed into the liquid pump 111, powered with DC power source 112 operating a fountain like exit flow pattern through the drinking tube 113 of FIG. 1.

Figure 5:
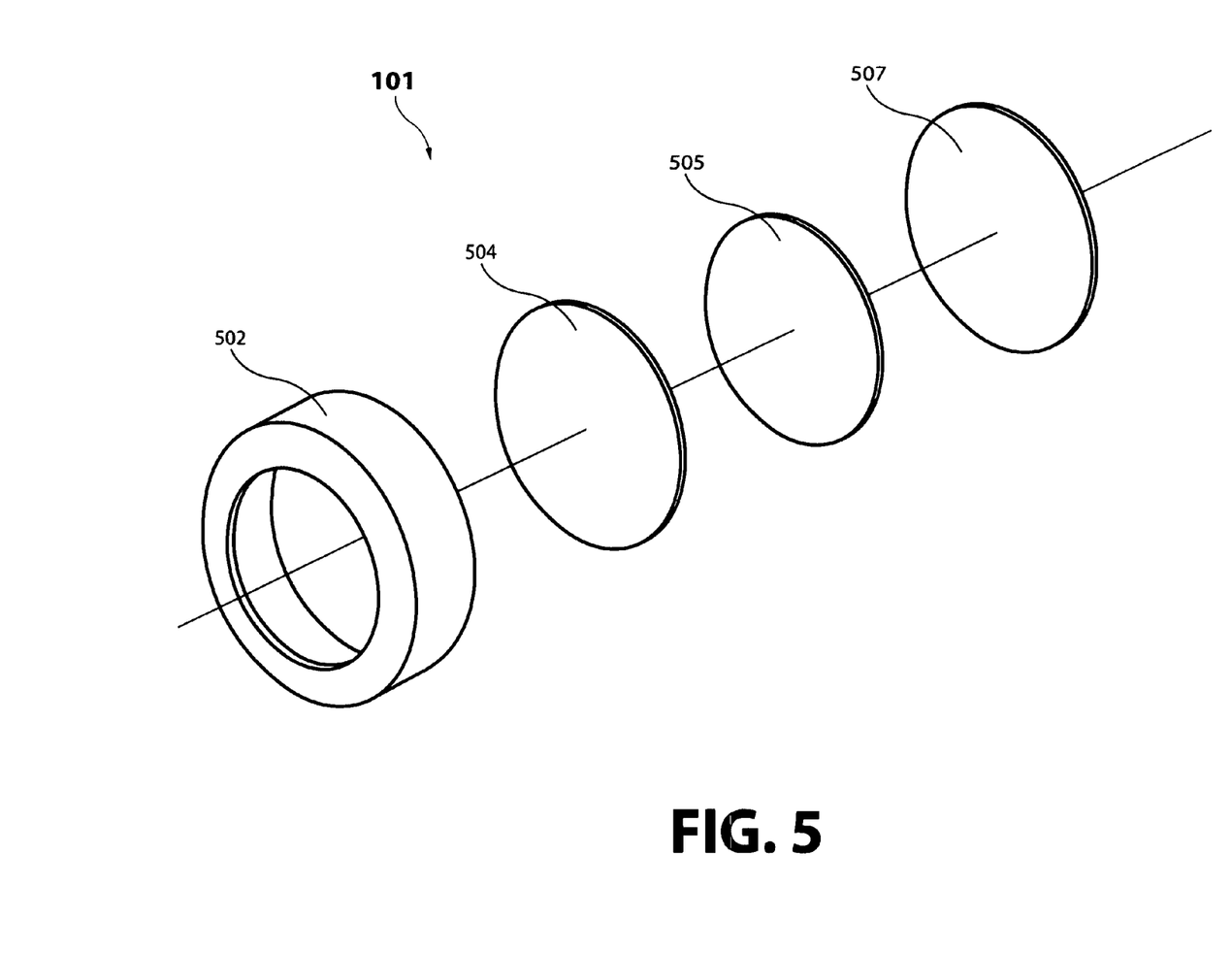
FIG. 5 shows a filter assembly for use in a portable water purifier filtering mechanism.

FIG. 5 shows the filter assembly 101 for use in a portable water purifier filtering mechanism. The filter assembly 101 such as a pancake filter may be the centerpiece for water filtration. The filter assembly 101 may contain an end cap 502 which may provide filter housing for a cloth filter pad 504, which is seamed into a pancake configuration with activated carbon absorption media 505, and a micron cloth polishing filter pad 507. The pancake filter 101 may contain female threading and snap locks to screw connect to the filter housing 102 of FIG. 1, which may contain a male thread housing connection. The cylindrical shaped housing 102 assembly may be a cone configuration to allow for optimum suction flow properties and to maximize filter operability. The cylindrical housing 102 may connect into the purifier container 103 bottom via a water-proof seal.

Figure 6:
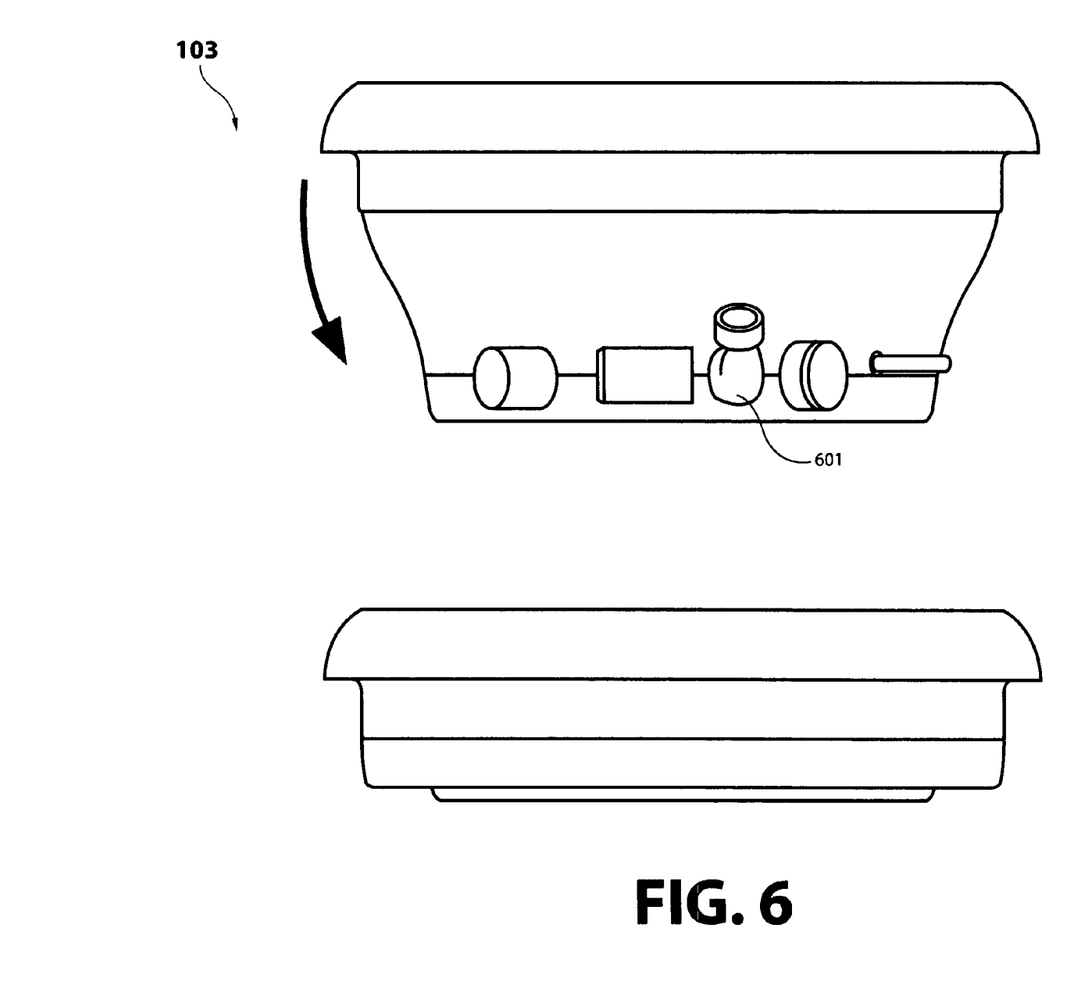
FIG. 6 shows a deformable portable water purifier reservoir container using collapsible methodology.

FIG. 6 shows a deformable portable water purifier reservoir container 103 using collapsible methodology. The collapsible method may collapse the purifier container 103 when pressure is applied. In extreme turbidity conditions, recycle clamp 601 is attached for recycling treated water back into the portable purifier for additional treatment. The container 103 may be made of silicon. Alternatively, the container can be made of plastic tubing with a top or cover, or inflatable plastic that deforms to a compact folding configuration when deflated.

Figure 7:
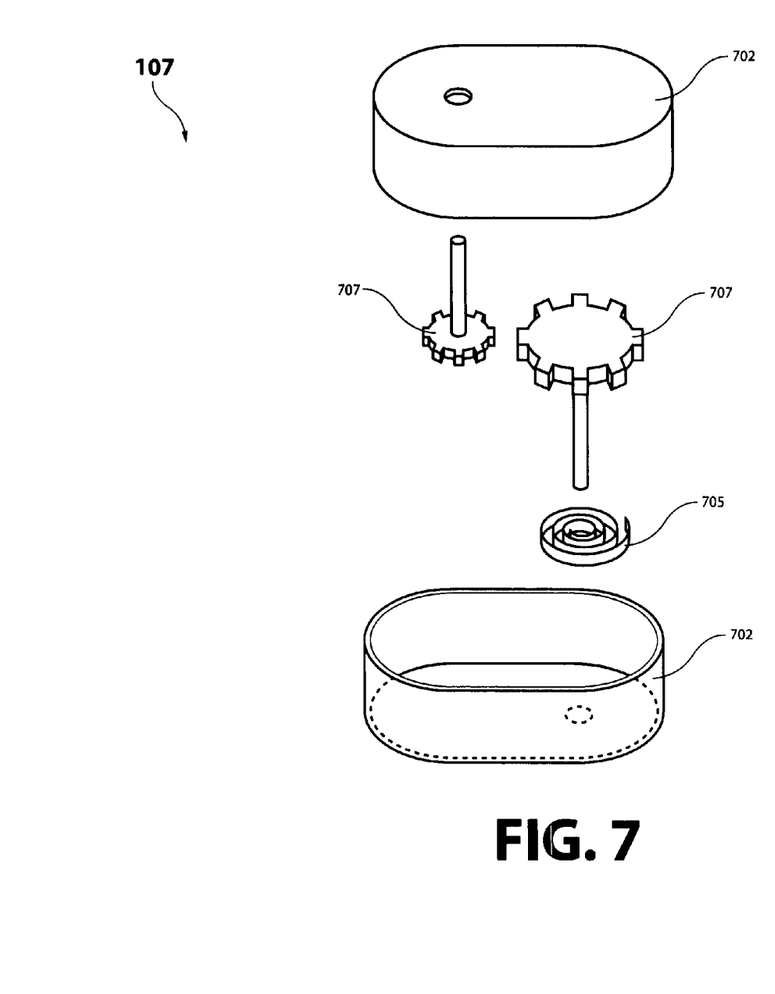
FIG. 7 shows a hand crank mechanism for use as an alternative to a power or battery source in a portable water purifier.

FIG. 7 shows a hand crank mechanism 107 for use as an alternative to a powered motor or battery source in a portable water purifier. The hand crank mechanism 107 may include covers 702, a coil 705 and winding gears 707 operable to drive the mixing blade 105 of FIG. 1 without the use of electricity or battery power.

Figure 8:
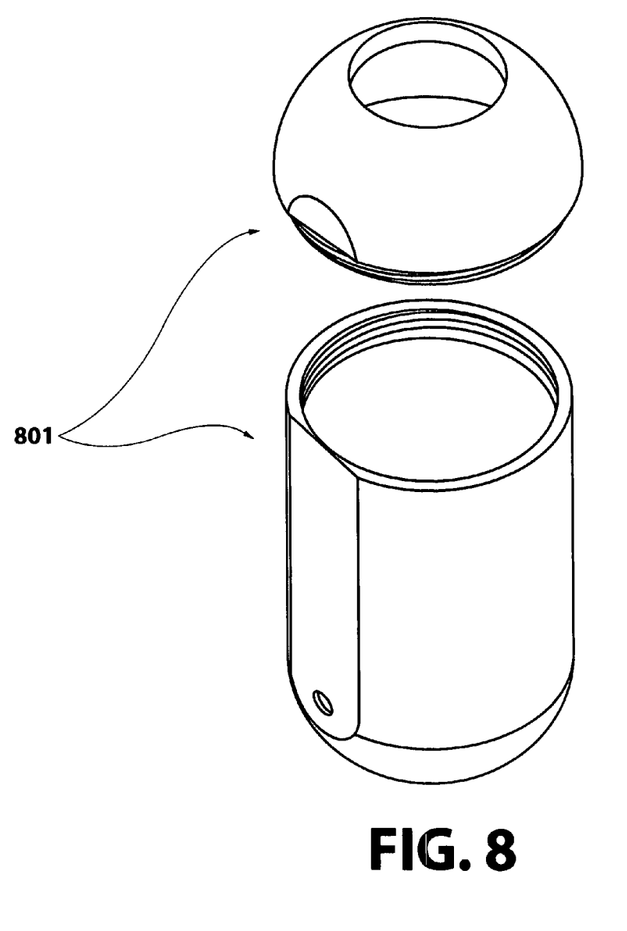
FIG. 8 shows a top container portable purifier for purification methods.

FIG. 8 shows a top tube container portable water purifier 801. The top tube container may be made of plastic tubing with a top or cover, an alternative to deformable silicon.

Referencing FIGS. 1-7, operation methodology of the purifier or purifier kit 100 may include expanding the purifier container 103. The container 103 is expanded from its collapsed state for use by pulling at the end of the container lid or rim. The container 103 may snap into a rested state after expanding shown in FIG. 6. Next untreated water may be collected into the container 103. Once water has been obtained, the air tight cap 204 may be untwisted off of the storage base 202 to obtain a water purification tablet 207. One tablet may include a mix of chemical disinfectant and flocculating agent. The tablet may then be added to the untreated water inside of the container 103. Next, operation of the mixing blade 105 by the drive mechanism 107 to mechanically operate mixing by cranking the resistance coil 705 or by activating the battery within the drive mechanism 108 for automatically operating the mixing motor 106. Following this, the mixing motor may spin the mixing blade 105 to agitate or "flocculate" the untreated water with the chemical tablet 207.

Chemical disinfectant may require a minimum of 15 minutes of contact time with bacteria and viruses to be effective. Flocculants, like Aluminum Sulfate, accelerate a process where particles form with one another to create larger particles, known as coagulation. Larger coagulated particles are easier to filter out through filtration. Thus, a primary component of the purifier kit 100 is the chemical disinfection and mixing process. The mixer 105 may operate for a period of approx 5 minutes, or until the chemical tablet has completely dissolved. Another period of approx 10 minutes may be needed to let dirt particulates develop into floc flakes and settle out from the water.

Following the settling of sediment floc, water may be pulled through the pancake filter assembly 101 by applying suction by mouth through the drinking tube 104 or by activating the liquid pump 111 to pull liquid through the pancake filter 101 from pump pressure. When water passes through the pancake filter 101, it is purified. In the purification process, liquid may pass through the cloth filter pad 504 to remove large particulates. Following the cloth filter pad, water may pass through the activated carbon absorption media 505 to remove odors, and residual smell from the water purification tablet 207. Finally, the filtered water may pass through the micron cloth polishing filter pad 507 to remove any final sediment floc from the consumable water.

To obtain purified water, pressure may be applied through mouth suction or liquid pump suction to the filtered water collection tubing 110, which through suction may pull water from the female to female quick connects 404 into the T-connector housing 402 and out through the clear water feed tubing 407.

While certain embodiments of the invention have been described, other embodiments may exist. Further, the disclosed methods' stages may be modified in any manner, including by reordering stages and/or inserting or deleting stages, without departing from the invention. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A portable water purifier for purifying a liquid to a safe form acceptable for drinking, the portable water purifier comprising:
    a container configured to hold the liquid;
    a filtering mechanism inside the container, the filtering mechanism configured to filter out dirt or sediment flock from the liquid; and
    a transport mechanism in communication with the filtering mechanism, the transport mechanism configured to transport the liquid into the filtering mechanism after the liquid has been purified within the container;
    wherein the filtering mechanism comprises a system of interconnected filter housings inside the container; and
    wherein at least one interconnected filter is secured onto at least one of the filter housings via a threaded end cap such that replacement of the at least one filter is conducted by twisting off the end cap and replacing the filter or twisting on and securing a new filter housing to the purifier, thereby limiting potential of a leak through of harmful contaminants and bacteria.

2. The portable water purifier of claim 1, further comprising a mixer inside the container configured to disperse a chemical disinfectant or at least one flocculating agent tablet within the liquid therein purifying the liquid inside the container.

3. The portable water purifier, of claim 2, wherein the mixer is configured to agitate the liquid.

4. The portable water purifier of claim 2, further comprising: a mixing motor configured to propel the mixer; and a power source configured to drive the mixing motor.

5. The portable water purifier of claim 4, wherein the mixing motor comprises a wind up crank motor wherein the power source comprises a mechanical crank configured to propel the mixer as the crank unwinds.

6. The portable water purifier of claim 1, further comprising a treatment tablet storage container attached to the purifier and configured to store purification treatment tablets.

7. The portable water purifier of claim 1, further comprising a drinking tube wherein the transport mechanism comprises a liquid pump operable to draw the liquid through the filtering mechanism and pump the liquid out of the drinking tube for recycling the liquid back into the purifier for re-purification and additional filtration or for consumption via mouth suction.

8. The portable water purifier of claim 1, wherein the transport mechanism comprises a drinking tube in communication with the filtering mechanism.

9. The portable water purifier of claim 7, wherein the drinking tube includes an attached clamp, the clamp operable to allow a user of the drinking tube flexibility of consuming the liquid which exits from the tube, or re-directing flow of the liquid back into the container via the drinking tube, to recycle the liquid for additional purification before additional filtration.

10. The portable water purifier of claim 1, further comprising a chemical disinfection and flocculation tablet.

11. The portable water purifier of claim 10, wherein the tablet comprises a mix of aluminum sulfate and chlorine dioxide.

12. The portable water purifier of claim 1, further comprising at least one of the following: a mixture of baking soda and bleach or a mixture of baking soda and vinegar to be dispersed within the container.

13. The portable water purifier of claim 1, wherein the container is collapsible and is operable to: contract for storage and transport by pushing the container downward by hand to collapse the purifier; and expand for purification by pulling the container upward by hand to a bowl view for use in any situation where water quality is unknown.

14. A portable water purifier for purifying a liquid to a safe form acceptable for drinking, the portable water purifier comprising:
    a container configured to hold the liquid;
    a filtering mechanism inside the container, the filtering mechanism configured to filter out dirt or sediment floc from the liquid; and
    a transport mechanism in communication mechanism in communication with the filtering mechanism, the transport mechanism configured to transport the liquid into the filtering mechanism after the liquid has been purified within the container;
    wherein the filtering mechanism comprises a system of interconnected filter housings inside the container;
    wherein at least one interconnected filter is secured onto at least one of the filter housings via a threaded end cap such that replacement of the at least one filter is conducted by twisting off the end cap and replacing the filter or twisting on and securing a new filter housing to the purifier, thereby limiting potential of a leak through of harmful contaminants and bacteria; and
    wherein the filter contains a cloth filter encasement with a carbon absorption media center within the at least one filter housing comprising a funnel cylinder housing, the filter configured to remove at least one of the following: floc sediment, odors, and a chlorine smell when liquid passes through the filter.

15. The portable water purifier of claim 14, wherein the funnel cylinder housing is configured to evenly disperse suction pressure along a surface area of the filter for even filter contact thereby effectuating water purification and filtration.

\* \* \* \* \*